United States Patent
Goh et al.

(10) Patent No.: US 12,203,957 B2
(45) Date of Patent: Jan. 21, 2025

(54) CERAMIC HEATER CONNECTOR

(71) Applicant: Rosemount Aerospace Inc., Burnsville, MN (US)

(72) Inventors: Jasmin Goh, Shakopee, MN (US); Andrew Paule, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 540 days.

(21) Appl. No.: 17/396,388

(22) Filed: Aug. 6, 2021

(65) Prior Publication Data

US 2023/0042157 A1  Feb. 9, 2023

(51) Int. Cl.
| | |
|---|---|
| *G01P 5/165* | (2006.01) |
| *B64D 47/00* | (2006.01) |
| *H01R 13/10* | (2006.01) |
| *H01R 13/502* | (2006.01) |
| *H05B 3/06* | (2006.01) |

(52) U.S. Cl.
CPC .............. *G01P 5/165* (2013.01); *B64D 47/00* (2013.01); *H01R 13/10* (2013.01); *H01R 13/502* (2013.01); *H05B 3/06* (2013.01); *H01R 2201/20* (2013.01); *H01R 2201/26* (2013.01)

(58) Field of Classification Search
CPC ....................................................... G01P 5/165
See application file for complete search history.

(56) References Cited

U.S. PATENT DOCUMENTS

| | | | |
|---|---|---|---|
| 2,204,367 A | 6/1940 | Kollsman | |
| 2,343,282 A | 3/1944 | Daiber | |
| 2,984,107 A | 5/1961 | Strieby et al. | |
| 3,091,750 A * | 5/1963 | Long | H01R 13/533 |
| | | | 439/321 |
| 3,237,918 A | 3/1966 | Le et al. | |
| 3,295,827 A | 1/1967 | Chapman et al. | |
| 2,970,475 A * | 2/1967 | Werner | G01K 13/028 |
| | | | 374/138 |
| 3,514,999 A | 6/1970 | Mejean et al. | |
| 3,745,512 A * | 7/1973 | Johnson | H01R 13/434 |
| | | | 439/732 |
| 6,070,475 A | 6/2000 | Muehlhauser et al. | |
| 2008/0317587 A1 | 12/2008 | Lord et al. | |
| 2010/0178800 A1 | 7/2010 | Clausen | |
| 2015/0159501 A1 | 6/2015 | Firnhaber | |

(Continued)

FOREIGN PATENT DOCUMENTS

| | | |
|---|---|---|
| EP | 3502416 A1 | 6/2019 |
| EP | 3670849 A1 | 6/2020 |

OTHER PUBLICATIONS

Extended European Search Report for European Patent Application No. 22188890.2, dated Dec. 9, 2022, 8 pages.

(Continued)

*Primary Examiner* — Walter L Lindsay, Jr.
*Assistant Examiner* — Andrew V Do
(74) *Attorney, Agent, or Firm* — Kinney & Lange, P.A.

(57) ABSTRACT

A connector includes a shell, an insert that fits within the shell, and a socket that extends within the insert. The socket includes a hood, a body within the hood, an annular tine extending from the body within the hood, an annular lip extending around the tine adjacent an end of the tine, and a cavity formed within the tine.

13 Claims, 4 Drawing Sheets

(56) References Cited

U.S. PATENT DOCUMENTS

2015/0361819 A1 12/2015 Epstein
2018/0371938 A1 12/2018 Skertic et al.

OTHER PUBLICATIONS

Extended European Search Report for European Patent Application No. 22185566.1, dated Dec. 8, 2022, 7 pages.
Alumel (R), Technical Data Sheet, Concept Alloys, 1 page, Revised Dec. 23, 2009.
Communication Pursuant to Article 94(3) EPC for European Patent Application No. 22188890.2, dated Apr. 26, 2024, 6 pages.

* cited by examiner

CERAMIC HEATER CONNECTOR

BACKGROUND

The present disclosure relates generally to connectors, and in particular, to connectors for air data probes.

Air data probes are installed on aircraft to measure air data parameters. Air data parameters may include barometric static pressure, altitude, air speed, angle of attack, angle of sideslip, temperature, total air temperature, relative humidity, and/or any other parameter of interest. Examples of air data probes include pitot probes, total air temperature probes, or angle of attack sensors.

Air data probes are mounted to an exterior of an aircraft in order to gain exposure to external airflow. Thus, air data probes are exposed to the environmental conditions exterior to the aircraft, which are often cold. As such, heaters are positioned within air data probes to ensure the air data probes function properly in liquid water, ice crystal, and mixed phase icing conditions. Connectors are used in transporting current from the transducer of the air data probe to the heater. It can be difficult maintain a connection between the transducer and the heater of the air data probe.

SUMMARY

A connector includes a shell, an insert that fits within the shell, and a socket that extends within the insert. The socket includes a hood, a body within the hood, an annular tine extending from the body within the hood, an annular lip extending around the tine adjacent an end of the tine, and a cavity formed within the tine.

An air data probe includes a probe head, a strut connected to the probe head, a mounting flange connected to the strut, a transducer connected to the mounting flange, a heater extending within the probe head and the strut, and a connector connected to the strut and positioned within the transducer. The connector includes a shell, an insert within the shell, and a socket that extends within the insert. The socket includes a hood, a tine extending within the hood, and an annular lip on the tine and extending around the tine such that the lip is between the tine and the hood.

DETAILED DESCRIPTION

In general, the present disclosure describes a connector for an air data probe that has a ceramic insert, a socket made of Alumel®, an alloy of approximately 95% nickel, 2% manganese, 2% silicon, and 1% aluminum, and a lip on each tine of the socket to dissipate heat and prevent the connector from expanding and disengaging from pins of the air data probe.

Figure 1:
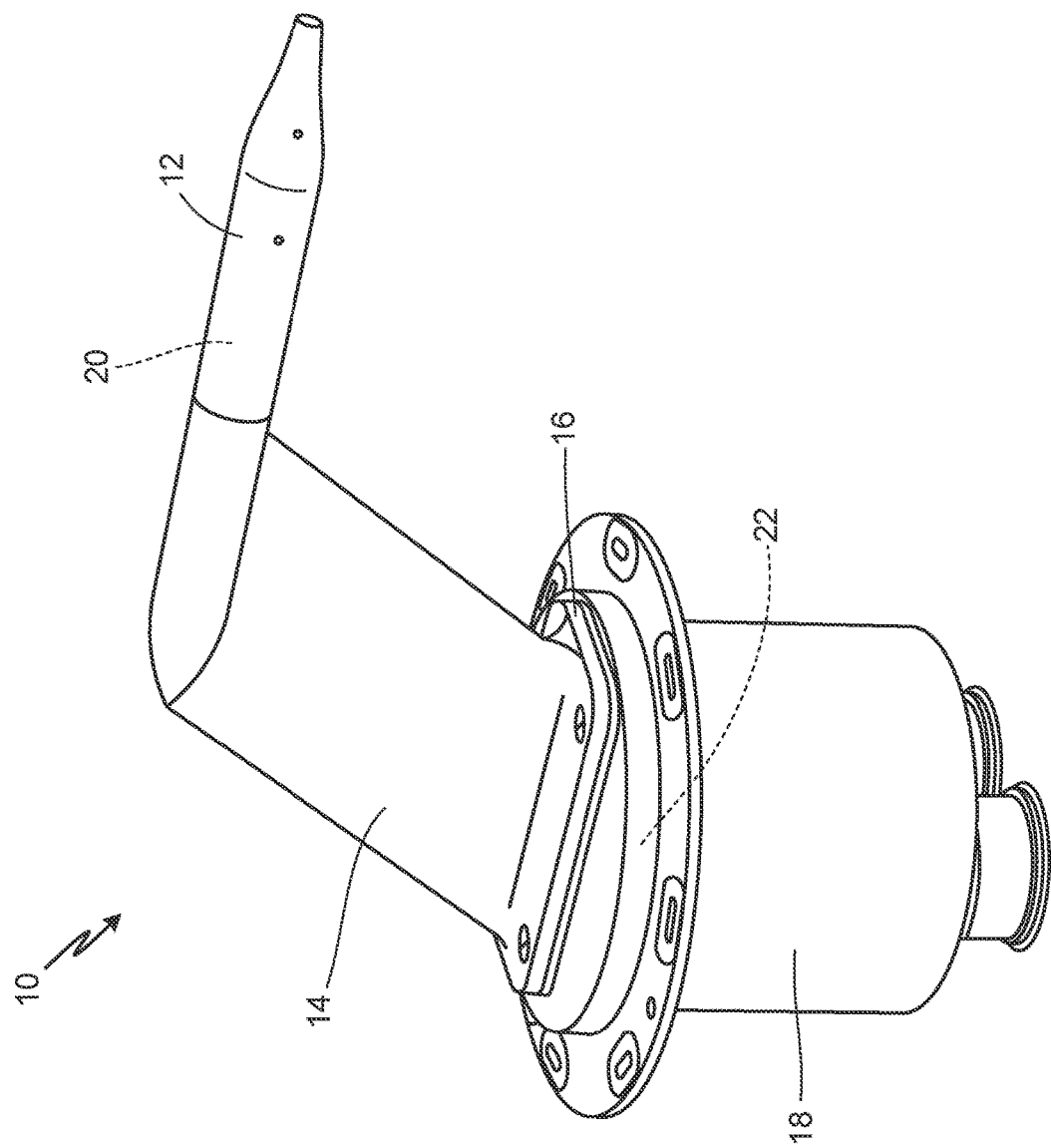
FIG. 1 is a perspective view of an air data probe.

FIG. 1 is a perspective view of air data probe 10. Air data probe 10 includes probe head 12, strut 14, mounting flange 16, transducer 18, heater 20, and connector 22.

Air data probe 10 may be a pitot probe, a pitot-static probe, or any other suitable air data probe. Probe head 12 is the sensing head of air data probe 10. Probe head 12 is a forward portion of air data probe 10. Probe head 12 has an opening at a first end of probe head 12. Probe head 12 is connected to a first end of strut 14 near a second end of probe head 12. Strut 14 is blade-shaped. Internal components of air data probe 10 are located within strut 14. Strut 14 is adjacent mounting flange 16. A second end of strut 14 is connected to mounting flange 16. Mounting flange 16 makes up a mount of air data probe 10. Mounting flange 16 is connected to transducer 18, which is a cylindrical housing or can of air data probe 10. Transducer 18 extends within and is connectable to an aircraft. Internal components of air data probe 10 are located within transducer 18. Heater 20 extends within probe head 12 and strut 14 and is connected to components within transducer 18 via connector 22. As such, connector 22 is connected to the second end of strut 14 and mounting flange 16 and is positioned within and enclosed inside transducer 18.

Air data probe 10 is configured to be installed on an aircraft. Air data probe 10 may be mounted to a fuselage of the aircraft via mounting flange 16 or transducer 18 and fasteners, such as screws or bolts. Strut 14 holds probe head 12 away from the fuselage of the aircraft to expose probe head 12 to external airflow. Probe head 12 takes in air from surrounding external airflow and communicates air pressures pneumatically through internal components and passages of probe head 12 and strut 14. Pressure measurements are communicated to a flight computer and can be used to generate air data parameters related to the aircraft flight condition. Connector 22 is the connection point between strut 14 and transducer 18. Connector 22 is used to supply power to heater 20 in strut 14 and probe head 12. As such, heater 20 is provided current from within transducer 18 via connector 22. Heater 20 prevents ice accumulation on air data probe 10 that could interfere with the functionality of air data probe 10.

Figure 2:
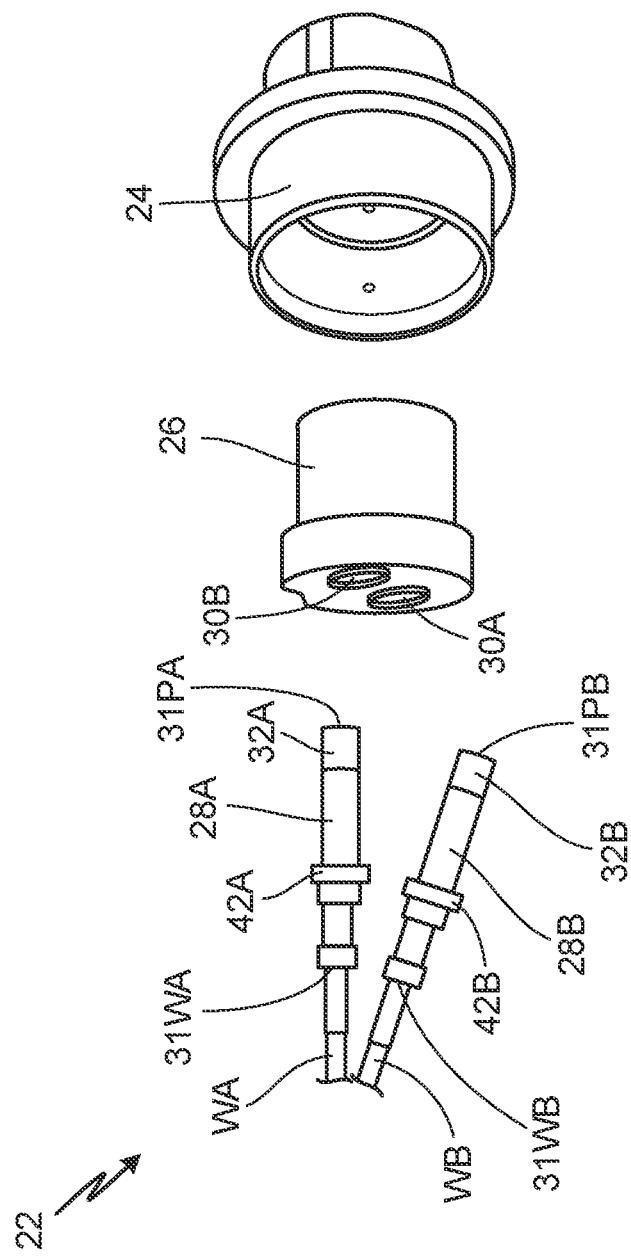
FIG. 2 is a perspective view of a connector in a disassembled state.
Figure 3:
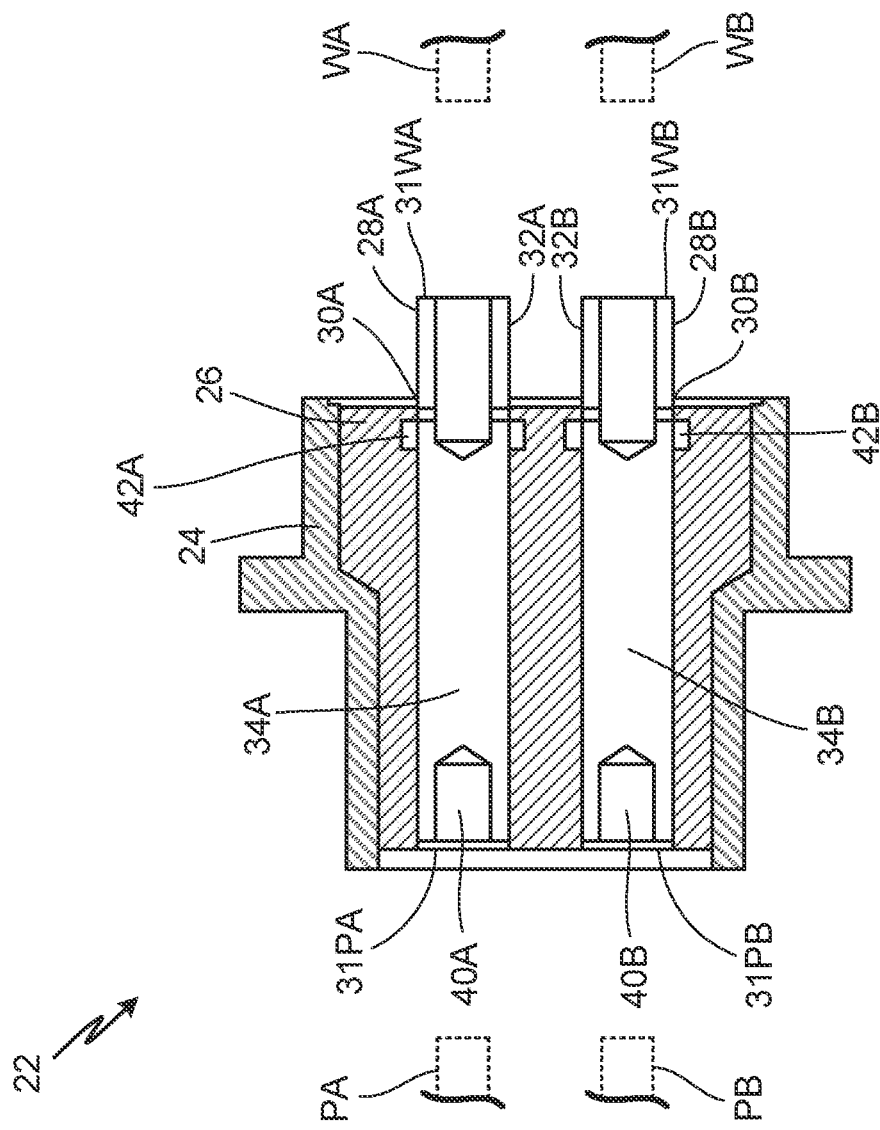
FIG. 3 is a schematic cross-sectional view of the connector.
Figure 4:
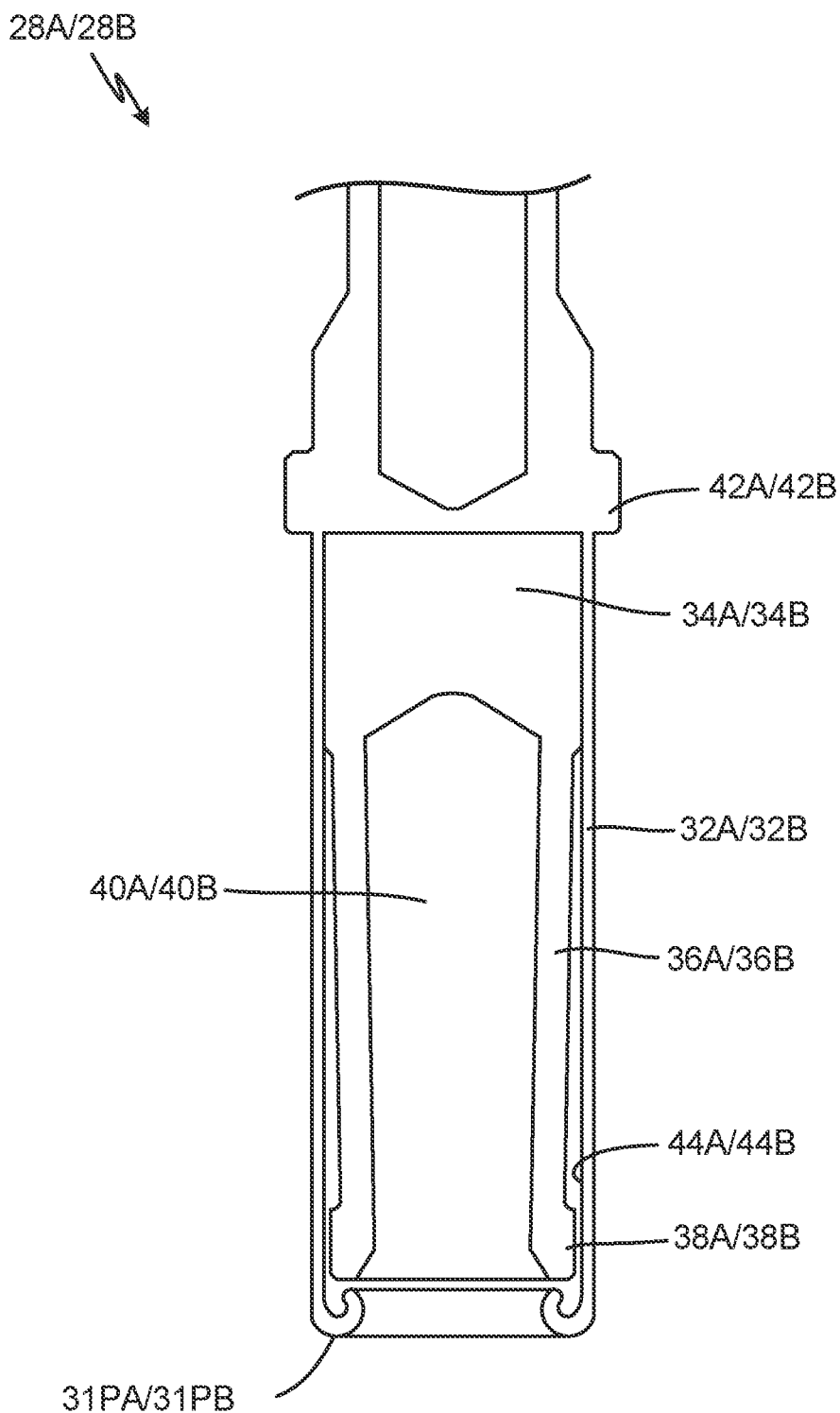
FIG. 4 is a partial cross-sectional view of the socket.

FIG. 2 is a perspective view of connector 22 in a disassembled state. FIG. 3 is a schematic cross-sectional view of connector 22. FIG. 4 is a partial cross-sectional view of socket 28A, 28B. FIGS. 2, 3, and 4 will be discussed together. Connector 22 includes shell 24, insert 26, and sockets 28A and 28B. Insert 26 includes openings 30A and 30B. Socket 28A (shown in FIG. 4) includes end 31PA, end 31WA, hood 32A, body 34A, tine 36A, lip 38A, cavity 40A, and ring 42A. Socket 28B is similar to socket 28A and includes end 31PB, end 31WB, hood 32B, body 34B, tine 36B, lip 38B, cavity 40B, and ring 42B. Hood 32A includes interior surface 44A, and hood 32B includes interior surface 44B.

Connector 22 is sized and shaped to connect to strut 14 and fit within transducer 18 of air data probe 10 to electrically connect heater 20 of air data probe 10 to current within transducer 18. Shell 24 makes up an outer portion of connector 22. Shell 24 is metallic and open on both ends. Insert 26 fits within and is positioned inside shell 24. Insert 26 is attached to shell 24 via an interference fit or with adhesive. Insert 26 is made of ceramic, which has a high thermal conductivity. Insert 26 has a first portion with a greater outer diameter than a second portion of insert 26. Sockets 28A and 28B extend within insert 26. Insert 26 has two openings 30A and 30B that extend from a first end to a second end of insert 26. Opening 30A is spaced from opening 30B. Socket 28A extends within opening 30A of insert 26, and socket 28B extends within opening 30B of insert 26. Sockets 28A and 28B extend from a first end to a second end of insert 26 such that sockets 28A and 28B extend an entire length of insert 26. Socket 28 is made of Alumel®, an alloy of approximately 95% nickel, 2% manganese, 2% silicon, and 1% aluminum.

As shown in FIG. 3, socket 28A has end 31PA at a first end of socket 28A and end 31WA at a second end of socket 28A. Thus, end 31PA is opposite end 31WA. Socket 28A has hood 32A making up an exterior of socket 28A. Hood 32A is made of stainless steel. Body 34A is positioned within hood 32A and is spaced from an end of hood 32A. As shown in FIG. 4, tine 36A extends from an end of body 34A within hood 32A. As such, hood 32A covers tine 36A. Tine 36A is annular. Lip 38A is on tine 36A. Lip 38A is annular and extends around an exterior surface of tine 36A adjacent an end of tine 36A opposite body 34A. Lip 38A and tine 36A may be unitary, or lip 38A may be attached to tine 36A. Cavity 40A is formed within tine 36A by tine 36A and the end of body 34A. Cavity 40A is shaped to accept pin PA (shown in phantom in FIG. 3) connected to heater 20 within strut 14 such that pin PA makes contact with tine 36A. Ring 42A extends around an exterior of hood 32A between end 31PA and end 31WA of socket 28A. Wire WA (shown in FIG. 2 and in phantom in FIG. 3) is crimped onto end 31WA of socket 28A, which is opposite end 31PA of socket 28A having cavity 40A that accepts pin PA. Wire WA connects to heater 20. Hood 32A has interior surface 44A on an interior of hood 31A. Lip 38A is between tine 36A and interior surface 44A of hood 32A. Lip 38A may contact interior surface 44A of hood 32A.

Similarly, socket 28B has end 31PB at a first end of socket 28B and end 31WB at a second end of socket 28B. Thus, end 31PB is opposite end 31WB. Socket 28B has hood 32B making up an exterior of socket 28B. Hood 32B is made of stainless steel. Body 34B is positioned within hood 32B and is spaced from an end of hood 32B. Tine 36B extends from an end of body 34B within hood 32B. As such, hood 32B covers tine 36B. Tine 36B is annular. Lip 38B is on tine 36B. Lip 38B is annular and extends around an exterior surface of tine 36B adjacent an end of tine 36B opposite body 34B. Lip 38B and tine 36B may be unitary, or lip 38B may be attached to tine 36B. Cavity 40B is formed within tine 36B by tine 36B and the end of body 34B. Cavity 40B is shaped to accept pin PB (shown in phantom in FIG. 3) connected to heater 20 within strut 14 such that pin PB makes contact with tine 36B. Ring 42B extends around an exterior of hood 32B between end 31PB and end 31WB of socket 28B. Wire WB (shown in FIG. 2 and in phantom in FIG. 3) is crimped onto end 31WB of socket 28B, which is opposite end 31PB of socket 28B having cavity 40B that accepts pin PB. Wire WB connects to heater 20. Hood 32B has interior surface 44B on an interior of hood 31B. Lip 38B is between tine 36B and interior surface 44B of hood 32B. Lip 38B may contact interior surface 44B of hood 32B.

Connector 22 transports current from one area to another area. As such, connector 22 provides an interface to get power from transducer 18 to heater 20 in air data probe 10. Connector 22 electrically connects heater 20 to current within transducer 18 via pins PA, PB connected to both heater 20 and sockets 28A and 28B of connector 22. Insert 26 of connector 22 holds sockets 28A and 28B in place within shell 24 of connector 22. Ceramic insert 26 of connector 22 also reduces the amount of heat in the vicinity of connector 22 by dissipating heat through ceramic insert 26 while also withstanding the required levels of vibration. Because sockets 28A and 28B are made of Alumel®, an alloy of approximately 95% nickel, 2% manganese, 2% silicon, and 1% aluminum, sockets 28A and 28B can withstand higher temperatures as well. Sockets 28A and 28B connect and hold connector 22 to pins PA and PB within mounting flange 16 and/or strut 14.

Stainless steel hood 32A, 32B of socket 28A, 28B holds socket 28A, 28B together, protects tine 36A, 36B and cavity 40A, 40B, and allows for easy handling of socket 28A, 28B. Tine 36A, 36B of socket 28A, 28B contacts pin PA, PB within cavity 40A, 40B of socket 28A, 28B. Lip 38A, 38B on tine 36A, 36B in combination with hood 32A, 32B prevents tine 36A, 36B from moving far enough away from pin PA, PB to disengage with pin PA, PB. More specifically, lip 38A, 38B results in tine 36A, 36B having a thicker end, which bottoms out and hits interior surface 44A, 44B of hood 32A, 32B to physically prevent tine 36A, 36B from thermally relaxing, expanding, and losing contact with pin PA, PB. Wire WA, WB is crimped to end 31PA, 31PB of socket 28A, 28B so that temperature does not affect the connection between wire WA, WB and socket 28A, 28B of connector 22. Ring 42A, 42B of socket 28A, 28B holds socket 28A, 28B in the proper position, or depth, within insert 26 of connector 22.

A traditional connector has an insert made of PEEK, which has a low thermal conductivity, and is susceptible to overheating. Heat becomes trapped and localized in the vicinity of the connector. The localized heat may degrade the quality of the connector over time if heat is not properly dissipated. A connector is especially at risk when the connector is in a small enclosed space, such as the very compact interior of transducer 18, with no readily available heat sink. If the connector of an air data probe overheats, it may disconnect from the pins that provide current to the heater, which causes the air data probe to ice and fail. A traditional socket is made of beryllium copper, which stress relaxes over time and in response to high temperature. As a result, the socket of the connector may undergo relaxation until it no longer makes contact with the pins on the air data probe. As the temperature increases, the tines relax and move away from the pins until the tines lose contact with the pins.

Ceramic insert 26, socket 28A, 28B made of Alumel®, an alloy of approximately 95% nickel, 2% manganese, 2% silicon, and 1% aluminum, and lip 38A, 38B on tine 36A, 36B of socket 28A, 28B allow connector 22 to withstand higher temperatures without losing connection with pins PA and PB. Because insert 26 of connector 22 is ceramic, insert 26 enables more heat to move away from connector 22 within the same space constraints of air data probe 10. Connector 22 can withstand the amount of heat and current being pulled by air data probe 10 due to effectively and quickly dissipating heat. Additionally, the distance tine 36A, 36B can expand is constrained by lip 38A, 38B, which only allows a certain amount of movement of tine 36A, 36B. Lip 38A, 38B decreases the area in which tine 36A, 36B can expand, causing lip 38A, 38B on tine 36A, 36B to hit interior surface 44A, 44B of hood 32A, 32B before disconnecting with pin PA, PB. As such, because tine 36A, 36B cannot expand beyond the diameter of pin PA, PB, tines 36A, 36B are physically prevented from expanding to the point of losing contact with pin PA, PB regardless of the temperature. Thus, connector 20 can withstand more heat or higher temperature environments. As a result, connector 22 increases the robustness of air data probe 10 while maintaining the same size such that connector 22 still fits within the space constraints of transducer 18. As such, connector 22 can be used in multiple models of air data probe 10. For example, an old connector can be retroactively replaced with connector 22.

While connector 22 has been described in reference to air data probe 10, connector 22 works across various air data probe models. Connector 22 also works in various applications, including applications requiring controlled expansion, such as applications in oil drilling.

Discussion of Possible Embodiments

The following are non-exclusive descriptions of possible embodiments of the present invention.

A connector includes a shell; an insert that fits within the shell; and a socket that extends within the insert, the socket comprising: a hood; a body within the hood; an annular tine extending from the body within the hood; an annular lip extending around the tine adjacent an end of the tine; and a cavity formed within the tine.

The connector of the preceding paragraph can optionally include, additionally and/or alternatively, any one or more of the following features, configurations and/or additional components:

The connector is configured to position within an air data probe.

The connector is sized and shaped to fit within a transducer of an air data probe to electrically connect a heater of the air data probe to current from within the transducer.

The insert is made of ceramic.

The socket is made of Alumel®, an alloy of approximately 95% nickel, 2% manganese, 2% silicon, and 1% aluminum.

The lip extends around an exterior of the tine.

The lip is between the tine and an interior surface of the hood.

The socket includes a first socket and a second socket, each of the first socket and the second socket comprising: a hood; a body within the hood; an annular tine extending from the body within the hood; an annular lip extending around the tine adjacent an end of the tine; and a cavity formed within the tine.

The insert is made of ceramic and the socket is made of Alumel®, an alloy of approximately 95% nickel, 2% manganese, 2% silicon, and 1% aluminum.

An air data probe includes a probe head; a strut connected to the probe head; a mounting flange connected to the strut; a transducer connected to the mounting flange; a heater extending within the probe head and the strut; and a connector connected to the strut and positioned within the transducer; the connector comprising: a shell; an insert within the shell; and a socket that extends within the insert, the socket comprising: a hood; a tine extending within the hood; and an annular lip on the tine and extending around the tine such that the lip is between the tine and the hood.

The air data probe of the preceding paragraph can optionally include, additionally and/or alternatively, any one or more of the following features, configurations and/or additional components:

The socket is made of Alumel®, an alloy of approximately 95% nickel, 2% manganese, 2% silicon, and 1% aluminum.

The insert is made of ceramic.

The socket is made of Alumel®, an alloy of approximately 95% nickel, 2% manganese, 2% silicon, and 1% aluminum and the insert is made of ceramic.

The tine is annular.

The lip extends around the tine adjacent an end of the tine.

The socket further comprises a body within the hood, the tine extending from the body within the hood, and a cavity formed within the tine.

The socket comprises a first socket and a second socket, each of the first socket and the second socket comprising: a hood; a tine extending within the hood; and an annular lip on the tine and extending around the tine such that the lip is between the tine and the hood.

The lip and the tine are unitary.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A connector comprising:
a shell;
an insert that fits within the shell, wherein the insert is made of ceramic;
a first socket that extends within the insert from a first end of the insert to a second end of the insert, the first socket comprising:
a first hood;
a first body within the first hood;
a first annular tine extending from the first body within the first hood;
a first annular lip extending around an exterior of the first tine adjacent an end of the first tine such that the first annular lip is between the first annular tine and the first hood; and
a first cavity formed within the first tine and shaped to accept a first pin; and
a second socket that extends within the insert from the first end of the insert to the second end of the insert, the second socket comprising:
a second hood;
a second body within the second hood;
a second annular tine extending from the second body within the second hood;
a second annular lip extending around an exterior of the second tine adjacent an end of the second tine such that the second annular lip is between the second annular tine and the second hood; and
a second cavity formed within the second tine and shaped to accept a second pin.

2. The connector of claim 1, wherein the first socket and the second socket are made of an alloy of approximately 95% nickel, 2% manganese, 2% silicon, and 1% aluminum.

3. The connector of claim 1, wherein the first lip is between the first tine and an interior surface of the first hood, and the second lip is between the second tine and an interior surface of the second hood.

4. A connector comprising:
a shell;
an insert that fits within the shell;
a first socket that extends within the insert from a first end of the insert to a second end of the insert, the first socket comprising:
a first hood;
a first body within the first hood;
a first annular tine extending from the first body within the first hood;

a first annular lip extending around an exterior of the first tine adjacent an end of the first tine such that the first annular lip is between the first annular tine and the first hood; and a first cavity formed within the first tine and shaped to accept a first pin; and a second socket that extends within the insert from the first end of the insert to the second end of the insert, the second socket comprising:

a second hood;

a second body within the second hood;

a second annular tine extending from the second body within the second hood;

a second annular lip extending around an exterior of the second tine adjacent an end of the second tine such that the second annular lip is between the second annular tine and the second hood; and a second cavity formed within the second tine and shaped to accept a second pin;

wherein the connector is sized and shaped to fit within a transducer of an air data probe to electrically connect a heater of the air data probe to current from within the transducer.

5. A connector comprising:

a shell;

an insert that fits within the shell; and a first socket that extends within the insert from a first end of the insert to a second end of the insert, the first socket comprising:

a first hood;

a first body within the first hood;

a first annular tine extending from the first body within the first hood;

a first annular lip extending around an exterior of the first tine adjacent an end of the first tine such that the first annular lip is between the first annular tine and the first hood; and a first cavity formed within the first tine and shaped to accept a first pin; and a second socket that extends within the insert from the first end of the insert to the second end of the insert, the second socket comprising:

a second hood;

a second body within the second hood;

a second annular tine extending from the second body within the second hood;

a second annular lip extending around an exterior of the second tine adjacent an end of the second tine such that the second annular lip is between the second annular tine and the second hood; and a second cavity formed within the second tine and shaped to accept a second pin.

6. An air data probe comprising:

a probe head;

a strut connected to the probe head;

a mounting flange connected to the strut;

a transducer connected to the mounting flange;

a heater extending within the probe head and the strut; and a connector connected to the strut and positioned within the transducer; the connector comprising:

a shell;

an insert within the shell; and a first socket that extends within the insert from a first end of the insert to a second end of the insert, the first socket comprising:

a first hood;

a first body within the first hood;

a first tine extending from the first body within the first hood;

a first annular lip on the first tine and extending around an exterior of the first tine such that the first annular lip is between the first annular tine and the first hood; and a second socket that extends within the insert from the first end of the insert to the second end of the insert, the second socket comprising:

a second hood;

a second body within the second hood;

a second tine extending from the second body within the second hood; and a second annular lip on the second tine and extending around an exterior of the second tine such that the second annular lip is between the second annular tine and the second hood.

7. The air data probe of claim 6, wherein the first socket is made of an alloy of approximately 95% nickel, 2% manganese, 2% silicon, and 1% aluminum.

8. The air data probe of claim 6, wherein the insert is made of ceramic.

9. The air data probe of claim 6, wherein the first socket and the second socket are made of an alloy of approximately 95% nickel, 2% manganese, 2% silicon, and 1% aluminum and the insert is made of ceramic.

10. The air data probe of claim 6, wherein the first tine and the second tine are annular.

11. The air data probe of claim 6, wherein the first lip extends around the first tine adjacent an end of the first tine, and the second lip extends around the second tine adjacent an end of the second tine.

12. The air data probe of claim 6, wherein the first socket further comprises a first cavity formed within the first tine, and the second socket further comprises a second cavity formed within the second tine.

13. The air data probe of claim 6, wherein the first lip and the first tine are unitary, and wherein the second lip and the second tine are unitary.

* * * * *